A. Bare.
Funnel.
N°54,279. Patented May 1, 1866.
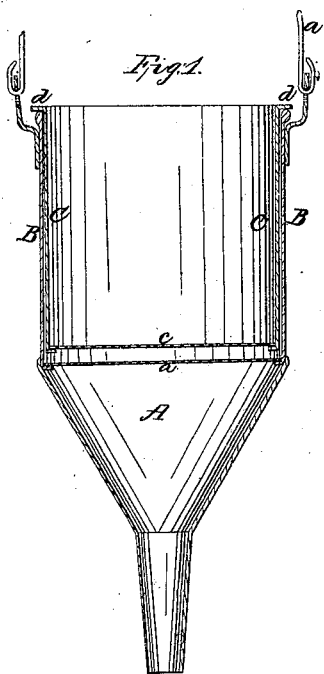
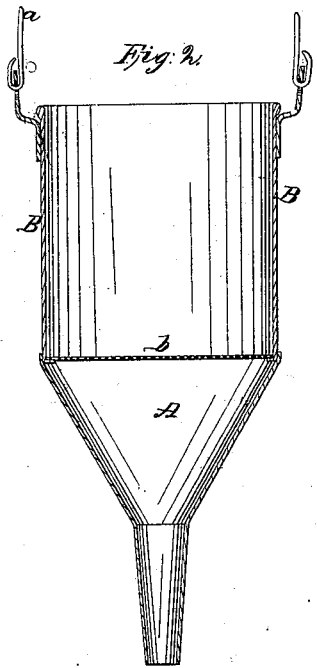
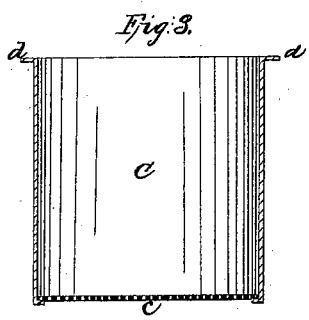
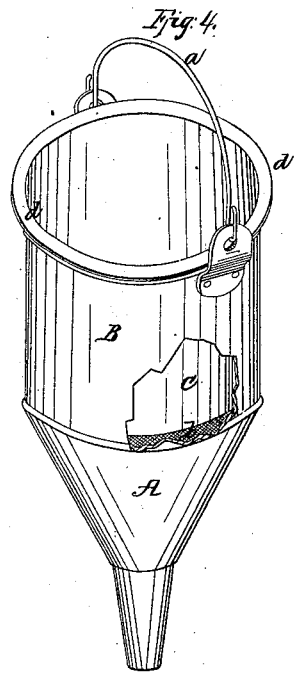
Witnesses.
Inventor

UNITED STATES PATENT OFFICE.

ABRAHAM BARE, OF MEXICO, OHIO.

IMPROVEMENT IN SORGHUM-FUNNELS.

Specification forming part of Letters Patent No. 54,279, dated May 1, 1866.

*To all whom it may concern:*

Be it known that I, ABRAHAM BARE, of Mexico, Wyandot county, State of Ohio, have invented a new and useful Sorghum-Funnel; and I do hereby declare that the following is a full, clear, and exact description thereof, reference being had to the accompanying drawings, making a part of this specification, in which—

Figure 1 is a diametrical section, through my funnel, having two strainers applied to it. Fig. 2 is a diametrical section of the funnel, having but one strainer. Fig. 3 is a section, through the movable strainer, detached from the funnel. Fig. 4 is a perspective view of a funnel having the fixed and movable strainer applied to it.

Similar letters of reference indicate corresponding parts in the several figures.

This invention is intended for transferring thick and viscous liquids from one vessel into another, and at the same time straining such liquids. It is particularly intended for straining sugar-juice where large quantities of the juice require to be transferred from one vessel to another with as little loss of time as possible.

The nature of my invention consists in constructing a funnel having a fixed or movable strainer applied to it in such manner that the superficial area of this strainer shall be nearly, if not quite, equal to the area of the top of the funnel, for the purpose of allowing the thick liquid to flow through the funnel with as little obstruction as possible, and also for the purpose of preventing a clogging of the funnel by the foreign substances which are mixed with the liquid, as will be hereinafter described.

Another object of my invention is to combine a cylindrical strainer with a funnel having a strainer applied to it, for the purpose of enabling a person to detach the one from the other when it is desired to clean them of the foreign substances which were strained from the sirup, as will be hereinafter described.

To enable others skilled in the art to understand my invention, I will describe its construction and operation.

In the accompanying drawings, A represents a funnel which is constructed of the usual form of liquid-funnels, with a conical body terminating at its lower end or apex in an elongated tube. To the upper edge of this funnel a cylinder, B, is soldered, which may be made of of any suitable capacity, and which is furnished with a bail, $a$, by means of which the funnel can be suspended from an object and sustained while liquid is being poured through it. At the upper end of the body of the funnel A a perforated sheet-metal plate or a wire-gauze strainer is secured, as shown at $b$, Figs. 1, 2, and 4, the area of which is equal to the area of the top of the cylinder B, thus allowing a free escape of the thick liquid poured into B to the funnel-chamber A, from which latter it passes off through the narrow neck. By thus constructing a funnel of a cylindro-conical form and applying a strainer within it at the point of junction of the cylinder with the cone, or above this point, the liquid which is poured into B will escape through the strainer very rapidly into the funnel A. By this means the liquid is strained before it enters the conical portion of the funnel.

C represents a cylinder having a strainer, $c$, applied to its bottom and a flange, $d$, formed on its upper edge. This cylinder is somewhat smaller in diameter than the cylinder B, and it is shorter than this cylinder, as shown in Fig. 1. Cylinder C is intended to fit within the cylinder B, and to serve as a movable strainer, either in conjunction with the strainer $a$ or without it, as may be desired. This movable strainer is intended for preventing the funnel from clogging with the sticks and pieces of cane and other substances which are left in the straining-cylinder C, as it will be seen that this latter strainer may be removed and cleaned whenever desired.

When both strainers $a$ and $c$ are used it will be found advantageous to allow a space between the two cylinders B and C for the passage of air down and between the strainers for facilitating the flow of the liquid through the lower strainer.

I am aware that strainers have been applied to common funnels by perforating their tubular necks and closing their lower ends; also, that strainers have been arranged at or near the bottoms of funnel-shaped vessels; but in all such devices the area of the strainer was much less than the area of the top of the funnel, and consequently the flow of liquid through such funnels was very much impeded by the limited capacity of the strainers. I do not therefore claim, broadly, the combination of a strainer with a funnel.

What I do claim as new, and desire to secure by Letters Patent, is—

1. A cylindro-conical funnel, A B, which is constructed with a strainer, $a$, applied at the junction of the cylinder with the cone, substantially in the manner described.

2. The combination of the cylindro-conical funnel A B with a removable strainer, $c$, substantially as described.

3. The combination of a fixed or permanent strainer, $a$, with a removable strainer, $c$, and a funnel, substantially as described.

ABRAHAM BARE.

Witnesses:
PETER B. BEIDLER,
HENRY A. HOYT.